July 26, 1932.  L. DE FLOREZ  1,868,523
CONTROL SYSTEM
Filed May 7, 1928  2 Sheets-Sheet 1

INVENTOR.
Luis de Florez.
BY Hoguet + Neary
ATTORNEYS.

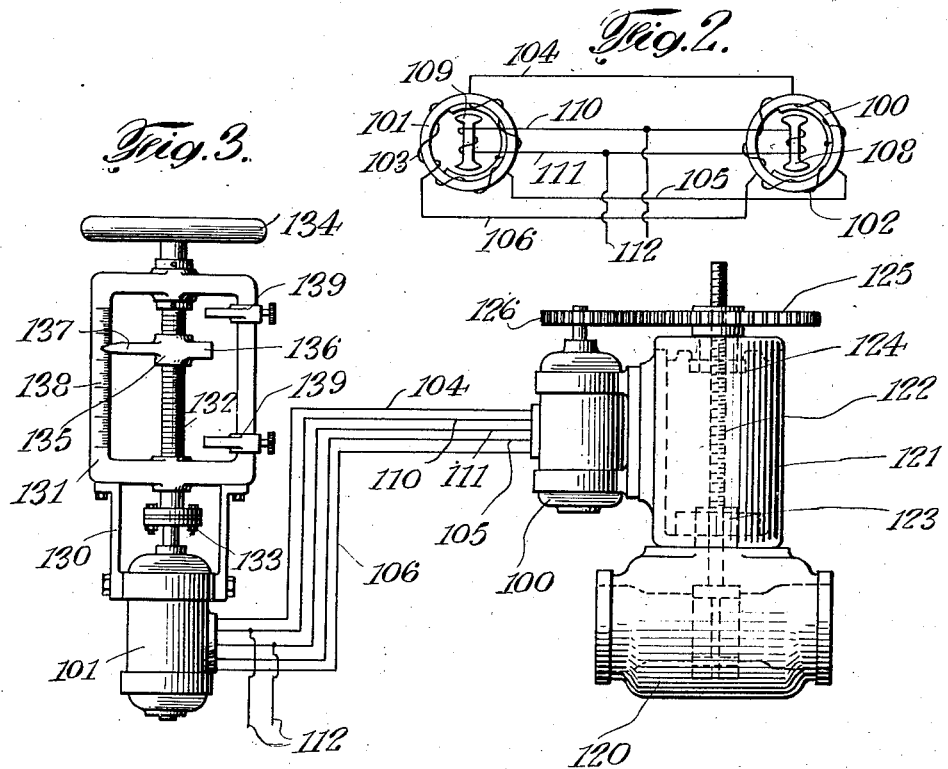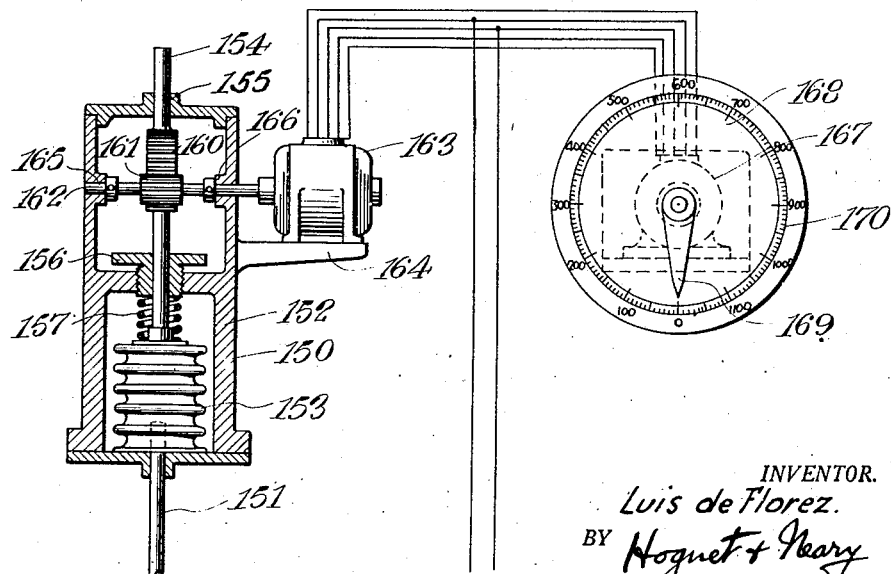

Patented July 26, 1932

1,868,523

UNITED STATES PATENT OFFICE

LUIS DE FLOREZ, OF POMFRET, CONNECTICUT

CONTROL SYSTEM

Application filed May 7, 1928. Serial No. 275,590.

This invention relates to control systems, and relates more particularly to control systems for petroleum refineries and cracking plants.

Petroleum refineries and cracking plants usually comprise a battery of two or more similar units, each operated relatively independently and each adapted to perform substantially the same operation. These batteries frequently contain ten or more units. Many plants include several such batteries, and in some cases each battery performs a different type of operation.

The most advantageous design of each unit, from a structural standpoint, would result in locating the vital controlling valves and indicating devices at a considerable distance from each other. Operating convenience, however, requires that as many as possible of the more important controls be grouped together in a single control house. Usually some one control cannot have its position materially changed, and so overshadows the others in importance that the control house is located adjacent this particular main control, such of the other controls and indicating devices as can conveniently be located in proximity to this main control being grouped in the same control house. In many cases this can be done only by bringing pipes far out of their direct path, and by locating in the control house apparatus such as pumps which could far more advantageously be placed at some other location were it not for the necessity of grouping the controls about the main control referred to above. In addition, various indicating devices such as pressure gauges, have heretofore necessarily been located at points remote from the control house, and a man sent around to inspect them at regular intervals. By careful design of such units, it has been found possible in some instances to assemble in one control house the principal controls for as many as three closely adjacent units. Even in such cases, however, the necessity still exists for regular inspection trips to indicating devices as above specified located at other parts of the system.

Where each battery consists of a large number of units, as is usually the case, it has heretofore been impossible to group all of the controls together, and usually three distinct control stations are required for each battery, one for the furnaces, one for the regulation of the main valves controlling the flow of the oil through the system, and another for the control of the charging pumps. Such a system naturally requires a skilled man to be stationed constantly at each of the three control centers, thus involving a large labor cost. A still greater disadvantage from the standpoint of efficient and economical operation, is the resulting division of responsibility and difficulty in properly co-ordinating the operation of the plant.

The control houses in such heretofore known plants are usually located in immediate proximity to one of the most dangerous points in the apparatus because of the necessity, as stated above, of grouping the controls around a main control, the location of which cannot be changed. As is well known, the operation of petroleum refineries and cracking plants is accompanied by an ever present danger from disastrous explosions or fires.

According to my invention I have provided a remote control system for such plants which enables all of the controls and indicators for a unit to be grouped in a single control house, which control house may be situated, if desired, at a safe distance from the danger points of the unit. Moreover, the controls for any number of units may be located in the same room or building. It is thus possible to have one man in entire charge of the operation of a battery of many units, instead of one man in charge of each two or three units or several men each in charge of a different portion of a battery as heretofore. In addition to effecting considerable savings in labor cost, my invention possesses the advantages of centralizing the control of the operation, the authority and the responsibility as well as making it relatively easy perfectly to co-ordinate the operation of the various parts of each unit and of the several units.

It is a primary object of my invention to provide a centralized control system for oil refining and cracking plants.

It is a further object of my invention to provide a completely centralized control system for such plants which may be located at any convenient point, and preferably remote from the dangerous portions of the plant.

It is a still further object of my invention to provide a centralized control system for oil plants which enables the entire operation of the plant to be observed and controlled from a central point by one operator.

Other objects and advantages of my invention will be apparent from the following description, taken in conjunction with the accompanying drawings, which form a part of this specification and in which:

Figure 2 is a diagrammatic wiring diagram of two self-synchronizing motors used in the control system shown in Figure 1;

Figure 1:
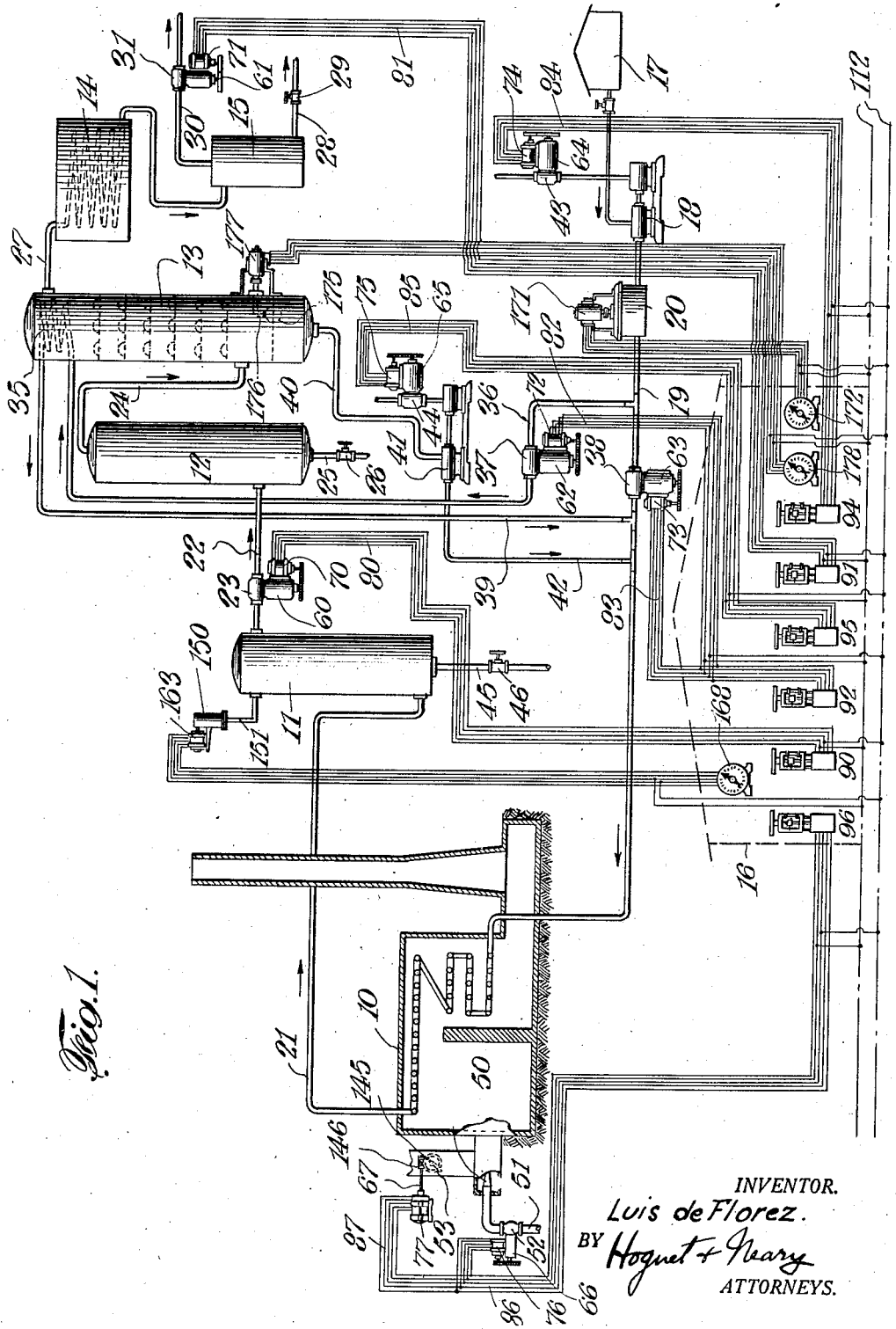
Figure 1 is a diagrammatic side elevation, partially in section, of an oil cracking plant of the well known tube and tank type, to which is applied my control system.

Figure 3 is a detailed view of a portion of the apparatus shown in Figure 1, comprising means according to my invention for controlling a valve from a distant point and at the same time providing an indication at said control point of the setting of the valve; and Figure 4 is a detailed view of a portion of the apparatus shown in Figure 1, comprising a pressure indicator according to my invention which may be located at a point remote from the point where the pressure is to be measured.

Referring more particularly to the drawings, the tube and tank cracking plant illustrated in Figure 1 comprises generally a pipe still 10 in which the oil to be cracked is raised to the desired cracking temperature, a soaking tank 11, a vaporizer 12, a fractionating column 13, a condenser 14, a gas separator 15 and a control house 16, which is outlined by dashed lines. The oil to be cracked is drawn from the supply tank 17 by the steam pump 18, and pumped through the line 19, in which is located a displacement meter 20, to the pipe still 10. From the pipe still 10 oil is discharged through the line 21 to the soaking tank 11 and is discharged from the soaking tank through the line 22, having a control valve 23, to the vaporizer 12. The hydrocarbons vaporized in the tower 12 are taken overhead through the line 24 and partially condensed in the bubble tower 13. The unvaporized residue remaining in the tower 12 may be drawn off through the line 25 controlled by the valve 26, and conducted to storage through a suitable cooler or heat exchanger, not illustrated. The lighter hydrocarbons which are not condensed in the bubble tower 13 are conducted through the overhead line 27 to the condenser 14, which discharges into the gas separator 15. The condensates are drawn off from the separator 15 through the pipe 28 controlled by the valve 29, and the non-condensable gases are withdrawn from the top of the separator through the gas line 30 controlled by the valve 31.

The top of the tower 13 is provided with a temperature regulating coil 35 which receives oil from a point in the line 19 beyond the meter 20 by means of the pipe 36 controlled by the valve 37. A valve 38 is located in the line 19 at a point beyond the connection of the pipe 36 thereto, and a pipe 39 conducts the oil which is passed through the coil 35 back to the line 19 at a point beyond the valve 38. By proper manipulation of the valves 37 and 38, therefore, any desired proportion of the fresh stock passing through the meter 20 may be by-passed through the coil 35 before being introduced into the pipe still 10.

The reflux condensate collecting in the bottom of the tower 13 may be drawn off through the line 40 by the steam pump 41 and forced through the line 42 into the pipe still 10, the line 42 being connected to the line 19 beyond the valve 38.

The quantity of steam admitted to the steam cylinders of the pumps 18 and 41 is controlled by the valves 43 and 44, respectively, located in the lines for supplying steam to the two pumps.

The soaking tank 11 is provided with an emergency draw-off line 45 having a control valve 46.

The pipe still 10 is provided with a burner 50 which is supplied with fuel through a pipe 51 having a valve 52. The air supplied to the burner 50, which may be under either natural or forced draft, is regulated by the air valve or damper 53.

The operation of such a system as has been above described is well understood by those skilled in the art and need not be herein described in detail. In the proper regulation of such a system, it is necessary to control the following items:

1. The valve 23 must be closely regulated to maintain the desired pressure in the soaking tank 11.

2. The valve 43 governing the supply of steam to the steam pump 18 must be set so as to obtain the desired rate of flow of oil through the meter 20.

3. The valve 44 governing the supply of steam to the steam pump 41 must be regulated so as to maintain the desired level of oil in the bottom of the tower 13.

4. The setting of the valves 37 and 38 must be regulated so that the proper quantity of oil will pass through the coil 35 to maintain the temperature in the top of the tower 13 at the desired point.

5. The supply of fuel and of air for combustion to the pipe still 10 must be controlled by means of the valve 52 and the damper 53, respectively, to secure the desired outlet temperature of the oil issuing from the still.

6. The valve 31 must be regulated to maintain the desired pressure in the gas separator 15, the condenser 14 and the tower 13.

These are the more important controls, and in the embodiment of my invention illustrated in Figure 1, I have provided means for regulating each of them from a single place, namely the control house 16. It will be understood, however, that, if desired, other portions of the plant may also be regulated from the central control house 16.

The proper regulation of the foregoing six items from the control house 16 requires the following apparatus to be located in the control house:

(a) Means for indicating the temperature of the oil at the outlet of the pipe still 10 and the temperature of the vapors in the top of the tower 13.

(b) Means for regulating each of the valves 23, 31, 37, 38, 43, 44, 52 and 53.

(c) Means for indicating the pressure existing in the soaking tank 11, and in the gas separator 15.

(d) Means for indicating the rate of flow of oil through the meter 20.

(e) Means for indicating the liquid level in the bottom of the bubble tower 13.

Devices for indicating temperature at a point remote from that at which the temperature is to be measured have long been known in the art. I may utilize any of the well known satisfactory devices of this character for the purpose of indicating in the control house 16 the temperatures mentioned under (a) above. The control house 16 would ordinarily also be equipped with additional temperature indicators adapted to give the temperatures existing at various other points of the system at any desired instant. The proper location of such temperature indicators is well understood by oil engineers, and will therefore not be described in detail. These temperature indicating devices are not illustrated because to do so would unduly complicate the drawings, and because any of the usual forms of such devices may be employed.

According to my invention, I provide an electrical remote control for operating each of the valves enumerated under (b) above from the control house 16. Reduced to its bare essentials, each of these electrical remote controls comprises two similar self-synchronizing alternating current motors of a special type known in the trade as Selsyn motors. These motors are so constructed that when properly connected together a movement of one motor will cause a corresponding movement of the other motor. One motor is mechanically connected to the valve so as to operate the same, and the other is located in the control house 16 and is adapted to be rotated manually or otherwise in order to effect the desired change in the setting of the valve. For convenience of description, I shall hereinafter use the term "operating mechanism" to describe each valve operating motor and the mechanism connected thereto, and the term "control device" to describe each control motor and its associated parts located in the control house 16.

Operating mechanisms 60 to 67 inclusive are mechanically connected to each of the valves 23, 31, 37, 38, 43, 44, 52, and 53, respectively, and are adapted to open and close the same. The operating mechanism 60 to 67 each include an electric motor 70 to 77, respectively, of the type described above, each of which serves to actuate the operating mechanism associated therewith. The motors 70 to 77 are provided with multi-wire electric cables 80 to 87, respectively, by means of which they are connected to control devices as described, located in the control house 16. Inasmuch as the valves 37 and 38 may advantageously be moved equal amounts in opposite directions, I connect the operating motors of these two valves directly together and to a single control device, the operating motors however having their connections reversed with respect to each other. In this manner the movement of a single control device simultaneously opens one of the valves and closes the other a corresponding amount. The fuel and air supply to the burner 50 should increase or decrease in the same ratio, and it is therefore possible, by proper proportioning of the valve 52 and the damper 53, to cause equal movements of their operating motors to produce the correct proportionate changes in the adjustment of these valves. The operating motors for the valve 52 and the damper 53 may therefore also be controlled by a single control device. The wire cables 82 and 83, and 86 and 87, respectively, are therefore connected together as shown in Figure 1. The cables 80, 81, 82 and 83, 84, 85, and 86 and 87, are connected respectively to control devices 90, 91, 92, 94, 95, and 96. Each of these control devices includes an electric motor similar to the motor on the valve operating mechanism associated therewith, each pair of motors being adapted to be operated in synchronism.

The wiring diagram of one pair of these motors is diagrammatically illustrated in Figure 2. Motor 100 may be connected to the valve which it is desired to operate, and motor 101 may be connected to a suitable actuating member and indicating device. The field windings 102 and 103 of the motors 100 and 101, respectively, are substantially similar to the field windings of an ordinary three-phase induction motor, and are connected together, as shown in the diagram, by the leads 104, 105, and 106. The rotors 108 and 109 of the motors 100 and 101, respectively, are shuttle wound and have definite poles, and the rotor windings are connected together through slip rings (not illustrated) by means of the leads 110 and 111. The leads 110 and 111 are energized from an ordinary 60 cycle single phase alternating current power line 112. Each pair of motors are of course identical in construction. When a turning force is exerted on the shaft of one of the motors, the change in the magnetic field of the motor will affect the other motor of the pair and cause its rotor to move the same distance as the rotor of the first motor has been moved. The distance between the two motors of course does not in the least affect the action above described. The construction, mode of connection and manner of operation of such motors are well understood by electrical engineers, and need not be herein described more fully. It will be apparent that by the use of such a pair of motors, the desired mechanism may be controlled from a distant point while at the same time obtaining an accurate indication of the operating position of the mechanism being controlled.

Figure 3 shows in detail a suitable construction of a valve operating mechanism and a control device therefor. The valve casing, which is indicated at 120, may be the casing of any one of the valves above enumerated. A yoke 121 is mounted on the casing of the valve 120 and the valve stem 122 passes freely through a bearing 123 in the lower part of the yoke 121. The outer end of the valve stem 122 is threaded and passes through a threaded collar 124 carried by the upper part of the yoke 121. The collar 124 is mounted so as to rotate freely within the yoke 121, but is not permitted to have any longitudinal movement with respect thereto. The collar 124 carries a gear 125 rigidly secured thereto, the gear 125 being in mesh with a pinion 126 secured to the shaft of the motor 100, the electrical connections of which are shown in Figure 2. The motor 100 may conveniently be mounted on the yoke 121 as shown. It will be obvious from the foregoing that rotation of the motor 100 will cause the threaded valve stem to be moved either up or down, depending upon the direction of rotation of the motor 100, and thus serve to open or close the valve 120.

The motor 101, which forms the other member of the pair, carries brackets 130 supporting a frame 131. A threaded spindle 132 is mounted in the frame 131 so as to be freely rotatable with respect thereto and the lower end of the spindle 132 is connected to the shaft of the motor 101 by means of the flexible coupling 133. A hand wheel 134 is secured to the upper end of the spindle 132 for convenience in turning the same. A threaded member 135 is mounted on the spindle 132 and carries a projection 136 and a pointer 137. The pointer 137 may be forked at its outer end so as to pass on either side of the frame 131, thereby preventing the member 135 from rotating with the spindle 132. A scale 138 is placed on the frame 131 to cooperate with the pointer 137. As the hand wheel 134 is rotated, therefore, the spindle will turn within the member 135 and cause it to move longitudinally of the frame. A pair of stops 139 are slidably mounted on the frame 131 in such manner as to cooperate with the projection 136 on the member 135, thus limiting the extent to which the hand wheel 134 may be rotated. The pitch of the threads on the spindle 132 should bear the same ratio to the pitch of the threads on the valve stem 122 as the ratio between the gear 125 and the pinion 126, if it is desired to have the extent of movement of the pointer 137 exactly equal that of the valve stem 122.

It will be obvious that as the hand wheel 134 is turned, the shaft of the motor 101 will be rotated and a corresponding rotation of the motor 100 will take place. The stops 139 are set so that further movement of the hand wheel is prevented when the valve has reached either limit of its travel. The pointer 137 will then indicate the extent of opening of the valve 120. The motor 101 and the parts cooperating therewith may conveniently be called a "dummy valve," and by locating this dummy valve in the control house 16, the operation of any valve connected thereto may be suitably regulated and its position accurately indicated in the control house.

The valve 53 controlling the air supply to the burner 50 may be of the conventional butterfly type, in which case the operating mechanism 67 will differ from the operating mechanism shown in Figure 3. As shown diagrammatically in Figure 1, the operating mechanism 67 may comprise simply a worm wheel 145 secured to the shaft of the damper 53 and a cooperating worm 146 secured to the shaft of the motor 77.

The valve 23 should of course be regulated in accordance with the pressure which it is desired to maintain in the soaking tank 11, and a pressure responsive device 150 is therefore connected to the soaking drum 11 by the pipe 151. Because of difficulties due to cooling and clogging of the pipe 151, it is necessary that it be short and hence that the pressure responsive device 150 be located near the soaking tank 11. The pressure responsive devices in common use have had their pressure indications read directly on dials located adjacent the pressure responsive device, thus necessitating frequent trips to the pressure gauge to read the pressure at the point to which it is connected. According to my invention, I provide means for reading the pressure indicated by the pressure responsive device 150 at any desired point remote therefrom. A suitable apparatus for this purpose is shown diagrammatically in Figure 1 and in detail in Figure 4. The pipe 151 leading from the point from which pressure is to be measured is connected to the pressure responsive device 150 which may comprise a casing 152 in which is located a closed bellows 153. The bellows 153 is provided with a stem 154 supported in a suitable bearing 155 in the casing 152. The stem 154 also passes through a threaded member 156 which cooperates with a tapped portion of the frame 152. A spring 157 is mounted upon the top of the bellows 153 and presses against the lower side of the member 156.

By adjustment of the member 156, therefore, the tension of the spring 157 may be adjusted so that the pressure responsive device may be calibrated in the usual manner. The construction so far described is old in the art and any other form of pressure responsive device may be substituted therefor.

The stem 154 is also provided with a rack 160 which cooperates with a pinion 161 mounted on a shaft 162 of the motor 163. The motor 163 may be mounted on an arm 164 secured to the casing 152 and the shaft 162 may rotate in suitable bearings 165 and 166 formed in the casing 152. The motor 163 is a self-synchronizing motor of the type already described and diagrammatically illustrated in Figure 2, and is connected to a similar motor 167 forming part of an indicator 168. The indicator 168 may comprise a pointer 169 secured to the shaft of the motor 167 and cooperating with a dial 170. The dial 170 may be marked to indicate directly the pressure corresponding to any particular position of the rack 160 on the pressure responsive device. In this manner the position of the pressure responsive device 150 and the corresponding pressure may be indicated at any point desired, however remote.

In order that the supply of steam to the steam pump 18 may be properly regulated it is necessary for the operator of the plant to know the rate of flow of oil through the meter 20. If convenient to do so the meter 20 may be located in the control house 16. If this is not convenient, the shaft or indicator of the meter may be connected directly to a Selsyn motor 171 suitably mounted on the casing of the meter, which motor 171 is connected to a similar motor operating an indicator 172 which may be substantially similar to the indicator 168 shown in Figure 4. The meter illustrated in Figure 1 is of the displacement nutating disc type, which type of meter has a continuously rotating shaft connected to the disc and serving to operate the customary indicating pointer. This shaft, according to my invention, is connected to the motor 171. It will be understood, however, that any other type of meter having either an oscillating or a rotating indicating member may be employed.

It is also necessary for the operator to know the liquid level in the bottom of the bubble tower 13. For this purpose I mount an ordinary ball float 175 on an arm 176 which is secured to the shaft of a Selsyn motor 177 at right angles thereto. The motor 177 is connected to an indicator 178 which is substantially similar to those heretofore described. As the ball rises or falls, the shaft of the Selsyn motor 177 is correspondingly rotated and the resulting movement shown on the indicator 178.

It will be obvious that if it is desired to know the liquid level in the bottom of the tower 12 and in the bottom of the gas separator 15, level indicators similar to that shown on the tower 13 may be employed. Also the valves 46, 26 and 29 may be advantageously operated from the control house 16 by remote control devices similar to those illustrated. The valves 26 and 29 need be adjusted only infrequently, and the valve 46 is opened only in emergencies or when the plant is shut down, and for these reasons, and also to simplify the drawings, I have not shown any remote control mechanism for these parts.

Although I have illustrated in the drawings only the application of my invention to a single cracking unit of the tube and tank type, it will be perfectly obvious that any number of units may be controlled from the same control house. I have refrained from illustrating a plurality of units simply to avoid repetition and undue complication of the drawings. Indeed, the main field of usefulness for my invention is where it is desired completely to control a large number of units, for example ten, from the same control house. Nor is my invention limited to the type of unit to be controlled. My invention is equally applicable to the control of any type of oil treating units, such as steam stills, crude stills, lubricating oil vacuum distillation equipment, and other types of cracking units than the one illustrated. In each case, the same problem due to handling a dangerous fluid and accurately controlling the conditions to which it is subjected in the various steps of the process, are present, and in each case my invention provides a ready and complete solution of the difficulties. I desire to be limited, therefore, only by the prior art and the scope of the appended claims.

I claim:

1. An oil plant, comprising in combination, a tubular heater, an evaporator, a pressure regulating valve between said heater and said evaporator, a control house, and means in said control house remote from said valve for manually controlling said valve from said control house, the remote manual control means comprising a manually operable member, an electrical torque conveying system comprising a transmitter and a receiver, a mechanical linkage directly connecting said manually operable member and said transmitter, and a mechanical linkage directly connecting said receiver and said valve, the electrical characteristics of said system being such that all of the power applied to said valve is derived from said manually operable member and that the resistance of said valve to adjustment is felt at said manually operable member, whereby the operator may determine the adjustment with reference to such resistance.

2. An oil plant, comprising in combination, a tubular heater, an evaporator, a bubble tower, adjustable control devices for said plant including a device for regulating the supply of oil to said heater, a pressure regulating valve between said heater and said evaporator and a device for regulating the withdrawal of condensate from said bubble tower, a control house, and independent means in said control house remote from said adjustable control devices for manually controlling each of said control devices from said control house, the remote manual control means for each of said adjustable devices comprising a manually operable member, an electrical torque transferring system comprising a transmitter and a receiver, a mechanical linkage directly connecting said manually operable member and said transmitter, and a mechanical linkage directly connecting said receiver and said adjustable device, the electrical characteristics of said system being such that all of the power applied to said adjustable device is derived from said manually operable member and that the resistance of said device to adjustment is felt at said manually operable member, whereby the operator may determine the adjustment with reference to such resistance.

In testimony whereof, I have signed my name to this specification this 17th day of April, 1928.

LUIS DE FLOREZ.